US012123156B2

(12) United States Patent
Zhu

(10) Patent No.: US 12,123,156 B2
(45) Date of Patent: Oct. 22, 2024

(54) PILE FOUNDATION WITH ANTI-IMPACT STRUCTURE FOR OFFSHORE WIND POWER AND CONSTRUCTION METHOD THEREOF

(71) Applicant: ZHEJIANG UNIVERSITY, Zhejiang (CN)

(72) Inventor: Ronghua Zhu, Zhejiang (CN)

(73) Assignee: ZHEJIANG UNIVERSITY, Zhejiang (CN)

( * ) Notice: Subject to any disclaimer, the term of this patent is extended or adjusted under 35 U.S.C. 154(b) by 187 days.

(21) Appl. No.: 17/946,009

(22) Filed: Sep. 15, 2022

(65) Prior Publication Data

US 2023/0228055 A1  Jul. 20, 2023

(30) Foreign Application Priority Data

Jan. 14, 2022 (CN) .......................... 202210043609.1

(51) Int. Cl.
*E02B 17/00* (2006.01)
(52) U.S. Cl.
CPC .... *E02B 17/003* (2013.01); *E02B 2017/0091* (2013.01)

(58) Field of Classification Search
CPC .................................................. E02B 17/003
See application file for complete search history.

(56) References Cited

FOREIGN PATENT DOCUMENTS

| CN | 206873356 U | * | 1/2018 |
| KR | 20190012039 A | * | 10/2019 |
| KR | 20190058096 A | * | 10/2019 |

* cited by examiner

*Primary Examiner* — Janine M Kreck
(74) *Attorney, Agent, or Firm* — JCIPRNET

(57) ABSTRACT

A pile foundation with an anti-impact structure for offshore wind power and a construction method thereof are provided. The anti-impact structure is sleeved on the pile foundation, and includes a first hoop, an impact absorption assembly and a second hoop. The impact absorption assembly includes a plurality of impact absorption rollers arranged around the pile foundation. Each of the impact absorption rollers includes a support shaft mechanism, an elastic absorber, a first sliding mechanism and a second sliding mechanism. The first sliding mechanism is slidably connected to the first hoop. The second sliding mechanism is slidably connected to the second hoop. The support shaft mechanism is rotatable relative to the first sliding mechanism and the second sliding mechanism.

10 Claims, 8 Drawing Sheets

PILE FOUNDATION WITH ANTI-IMPACT STRUCTURE FOR OFFSHORE WIND POWER AND CONSTRUCTION METHOD THEREOF

CROSS-REFERENCE TO RELATED APPLICATION

This application claims the priority benefit of China application no. 202210043609.1, filed on Jan. 14, 2022. The entirety of the above-mentioned patent application is hereby incorporated by reference herein and made a part of this specification.

BACKGROUND

Technical Field

The present invention belongs to the field of offshore wind power engineering, and in particular relates to a pile foundation with an anti-impact structure for offshore wind power and a construction method thereof.

Description of Related Art

There is a risk for offshore pile foundations to impact with ships. In the prior art, buffer materials are generally arranged around a pile foundation to absorb an impact force. However, these buffer materials are usually fixed in position and cannot be moved, such that they are not flexible enough to use, and the anti-impact effect is not good enough.

SUMMARY

In order to make up for the deficiencies in the prior art, the present invention provides a technical solution of a pile foundation with an anti-impact structure for offshore wind power and a construction method thereof.

A pile foundation includes an anti-impact structure for offshore wind power. The anti-impact structure is sleeved on the pile foundation, and includes a first hoop, an impact absorption assembly and a second hoop that are arranged in sequence from top to bottom. The first hoop and the second hoop are configured to hold the pile foundation tightly. The impact absorption assembly includes a plurality of impact absorption rollers arranged around the pile foundation. Each of the impact absorption rollers includes a support shaft mechanism vertically arranged along the pile foundation, an elastic absorber sleeved on the support shaft mechanism, a first sliding mechanism rotatably arranged at an upper end of the support shaft mechanism, and a second sliding mechanism rotatably arranged at a lower end of the support shaft mechanism. The first sliding mechanism is slidably connected to the first hoop, the second sliding mechanism is slidably connected to the second hoop, and the support shaft mechanism is rotatable relative to the first sliding mechanism and the second sliding mechanism.

Further, the support shaft mechanism includes a central shaft, a sleeve sleeved outside the central shaft, and a hub fixedly arranged between the central shaft and the sleeve. Upper and lower ends of the central shaft are respectively and rotatably connected to the first sliding mechanism and the second sliding mechanism.

Further, the first sliding mechanism is a first roller wheel mechanism, and includes a first wheel shaft and first roller wheels arranged on the first wheel shaft. An upper end of the central shaft is rotatably connected to the first wheel shaft.

Further, the first hoop is provided with a first slide rail, the first slide rail is formed with a first slide rail groove, the first roller wheel mechanism is located in the first slide rail groove, and the first roller wheels of the first roller wheel mechanism are slidably connected to the first slide rail groove.

Further, the second sliding mechanism is a second roller wheel mechanism, and includes a second wheel shaft and second roller wheels arranged on the second wheel shaft. A lower end of the central shaft is rotatably connected to the second wheel shaft.

Further, the second hoop is provided with a second slide rail, the second slide rail is formed with a second slide rail groove, the second roller wheel mechanism is located in the second slide rail groove, and the second roller wheels of the second roller wheel mechanism are slidably connected to the second slide rail groove.

Further, the first hoop includes at least two first hoop components, the first hoop components are of an arc-shaped structure, and the first hoop components are connected end to end by bolts to form the complete first hoop.

Further, the second hoop includes at least two second hoop components, the second hoop components are of an arc-shaped structure, and the second hoop components are connected end to end by bolts to form the complete second hoop.

The present invention further provides a construction method of a pile foundation with an anti-impact structure for offshore wind power, and the construction method includes the following steps.

Step S100: designing a size of each member of the anti-impact structure according to measurement information before construction, and completing prefabrication in a factory.

Step S200: after the prefabrication is completed, assembling support shaft mechanisms, elastic absorbers, first sliding mechanisms and second sliding mechanisms that are prefabricated in the factory, so as to form impact absorption rollers.

Step S300: assembling first hoop components, second hoop components and a plurality of the impact absorption rollers into anti-impact structure modules.

Step S400: installing at least two fabricated anti-impact structure modules to the pile foundation, and performing end-to-end connection by bolts to form the complete anti-impact structure.

Further, in the step S400, when the first hoop components and the second hoop components are connected to the pile foundation, rubber pads are placed on inner sides of the first hoop components and the second hoop components.

Compared with the prior art, the present invention has the following beneficial effects.

1. According to the present invention, the impact absorption rollers are capable of not only absorbing an impact force, but also transferring the impact force of a ship by rotation and sliding on the two hoops, such that the impact of the ship on the pile foundation is greatly reduced, the degree of structural deformation and damage is reduced, the safety of an offshore wind power structure is protected, and the operation and maintenance costs are lowered.
2. According to the present invention, the construction method is simple and flexible, the anti-impact structure can be installed on the pile foundation that has been built, and the construction period can be greatly shortened.

DESCRIPTION OF THE EMBODIMENTS

Figure 1:
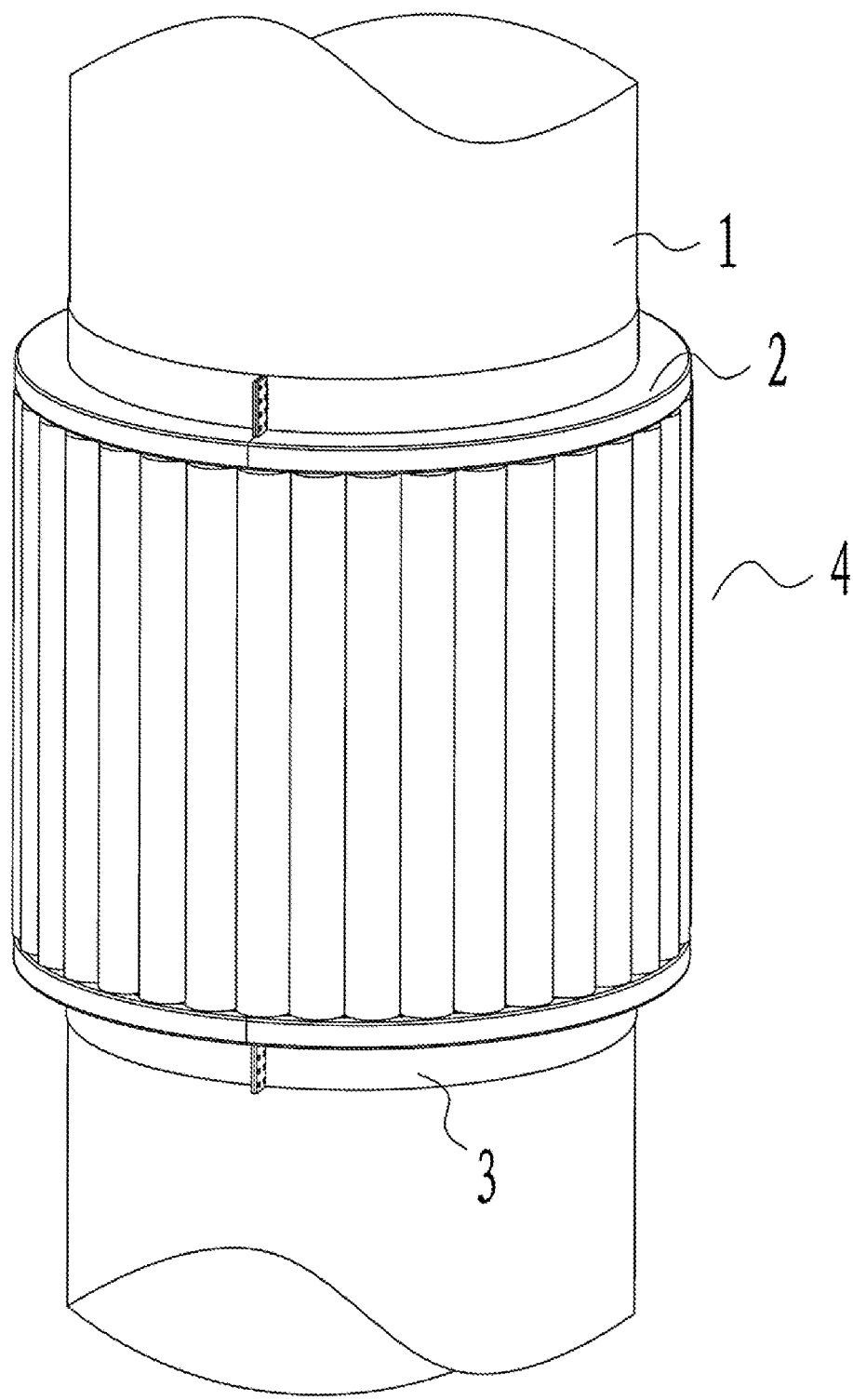
FIG. 1 is a schematic structural diagram of an embodiment 1.
Figure 2:
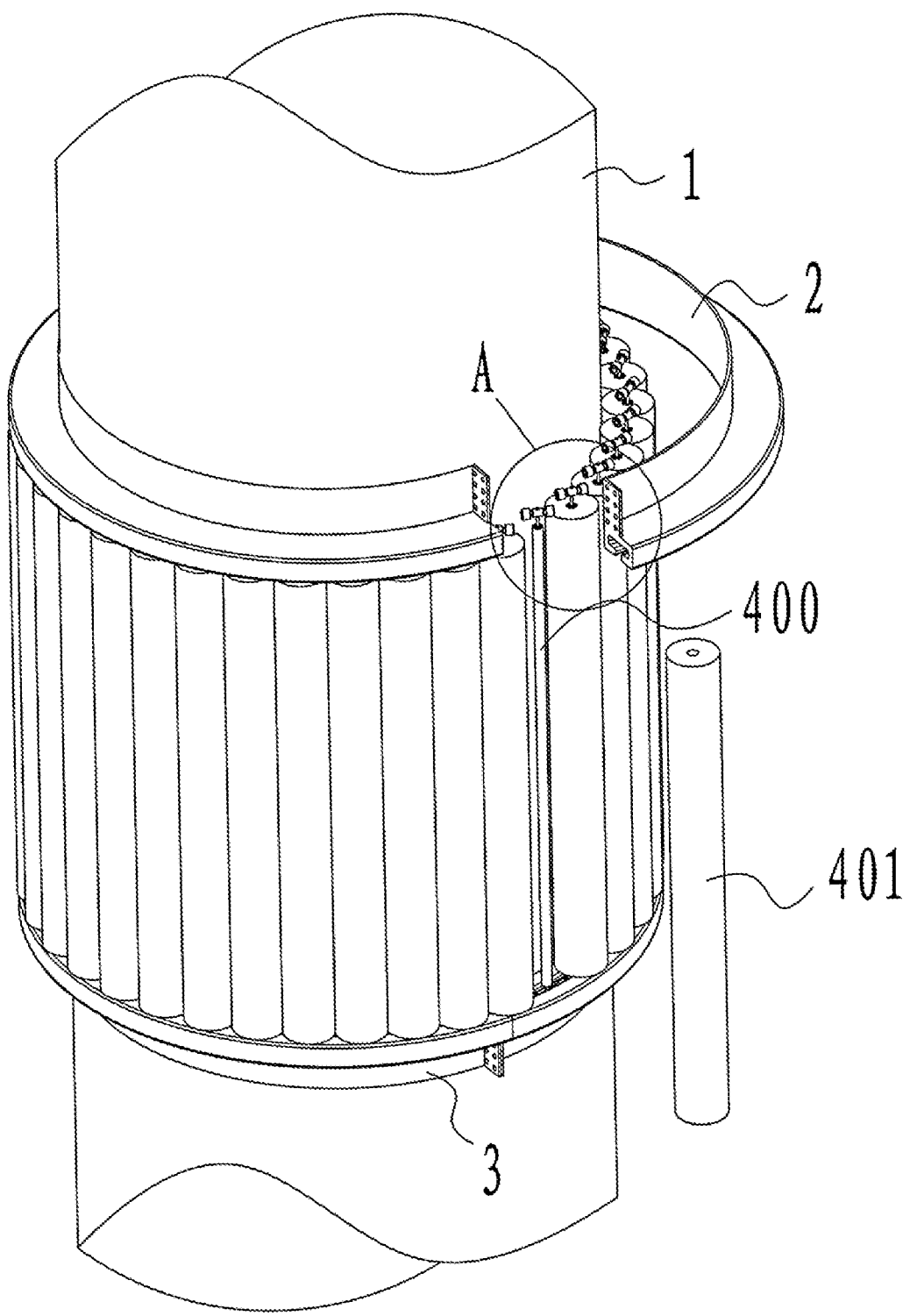
FIG. 2 is a schematic exploded structural view of the embodiment 1.

The present invention is further described below in conjunction with the accompanying drawings.

Embodiment 1

Referring to FIG. 1 to FIG. 8, provided is a pile foundation with an anti-impact structure for offshore wind power. The anti-impact structure is sleeved on the pile foundation 1, and includes a first hoop 2, an impact absorption assembly and a second hoop 3 that are arranged in sequence from top to bottom. The first hoop 2 and the second hoop 3 are configured to hold the pile foundation 1 tightly. The impact absorption assembly includes a plurality of impact absorption rollers 4 arranged around the pile foundation 1. The impact absorption rollers 4 are closely arranged. Each of the impact absorption rollers 4 includes a support shaft mechanism vertically arranged along the pile foundation 1, an elastic absorber 401 sleeved on the support shaft mechanism, a first sliding mechanism rotatably arranged at an upper end of the support shaft mechanism, and a second sliding mechanism rotatably arranged at a lower end of the support shaft mechanism. The first sliding mechanism is slidably connected with the first hoop 2. The second sliding mechanism is slidably connected with the second hoop 3, and the elastic absorber 401 and the support shaft mechanism are rotatable relative to the first sliding mechanism and the second sliding mechanism.

It can be understood that by adopting the above technical solution, when a ship impacts the anti-impact structure, the elastic absorbers 401 can absorb an impact force, and then this embodiment can also transfer the impact force of the ship by rotation of the elastic absorbers 401 and sliding of the impact absorption rollers 4 on the two hoops, such that the impact of the ship on the pile foundation 1 is greatly reduced.

Figure 3:
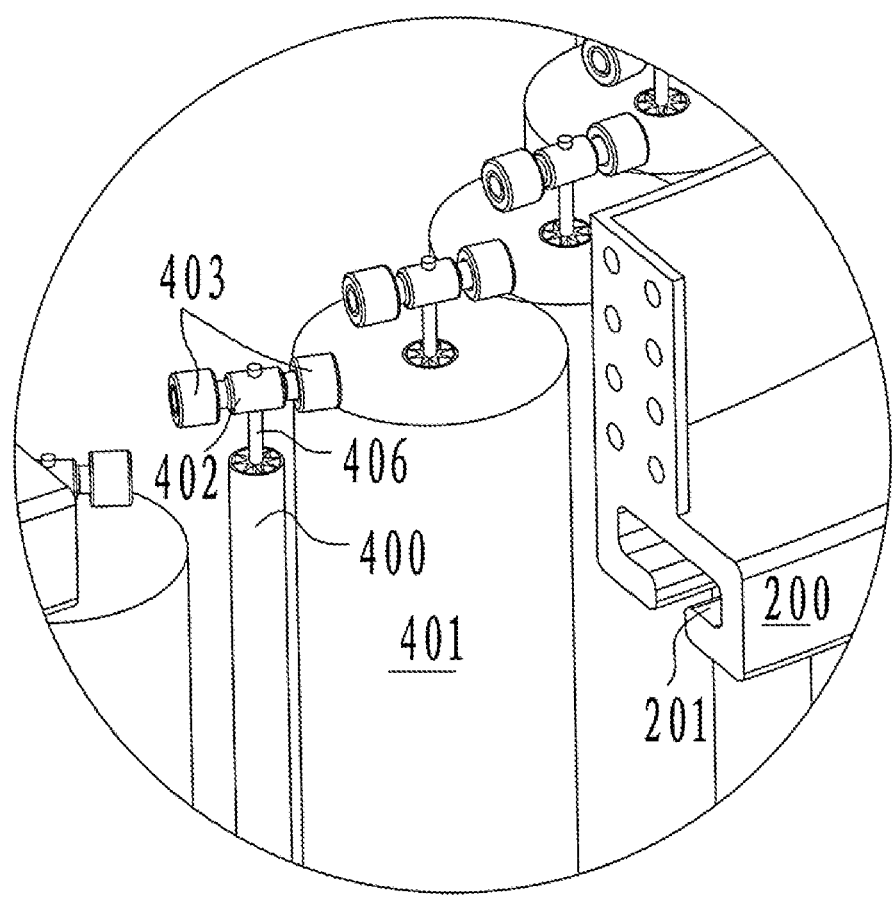
FIG. 3 is an enlarged view of A in FIG. 2.

Continuing to refer to FIG. 3, the support shaft mechanism includes a central shaft 406, a sleeve 400 sleeved outside the central shaft 406, and a hub 407 fixedly arranged between the central shaft 406 and the sleeve 400. Upper and lower ends of the central shaft 406 are respectively rotatably connected with the first sliding mechanism and the second sliding mechanism.

The central shaft 406, the sleeve 400 and the hub 407 are all made of metal materials, and the elastic absorber 401 is made of a rubber material or a foamed aluminum material.

It can be understood that the structural design of the above-mentioned support shaft mechanism can reduce its own weight under the condition of satisfying a support force, thereby reducing the burden of construction and the pile foundation.

Figure 4:
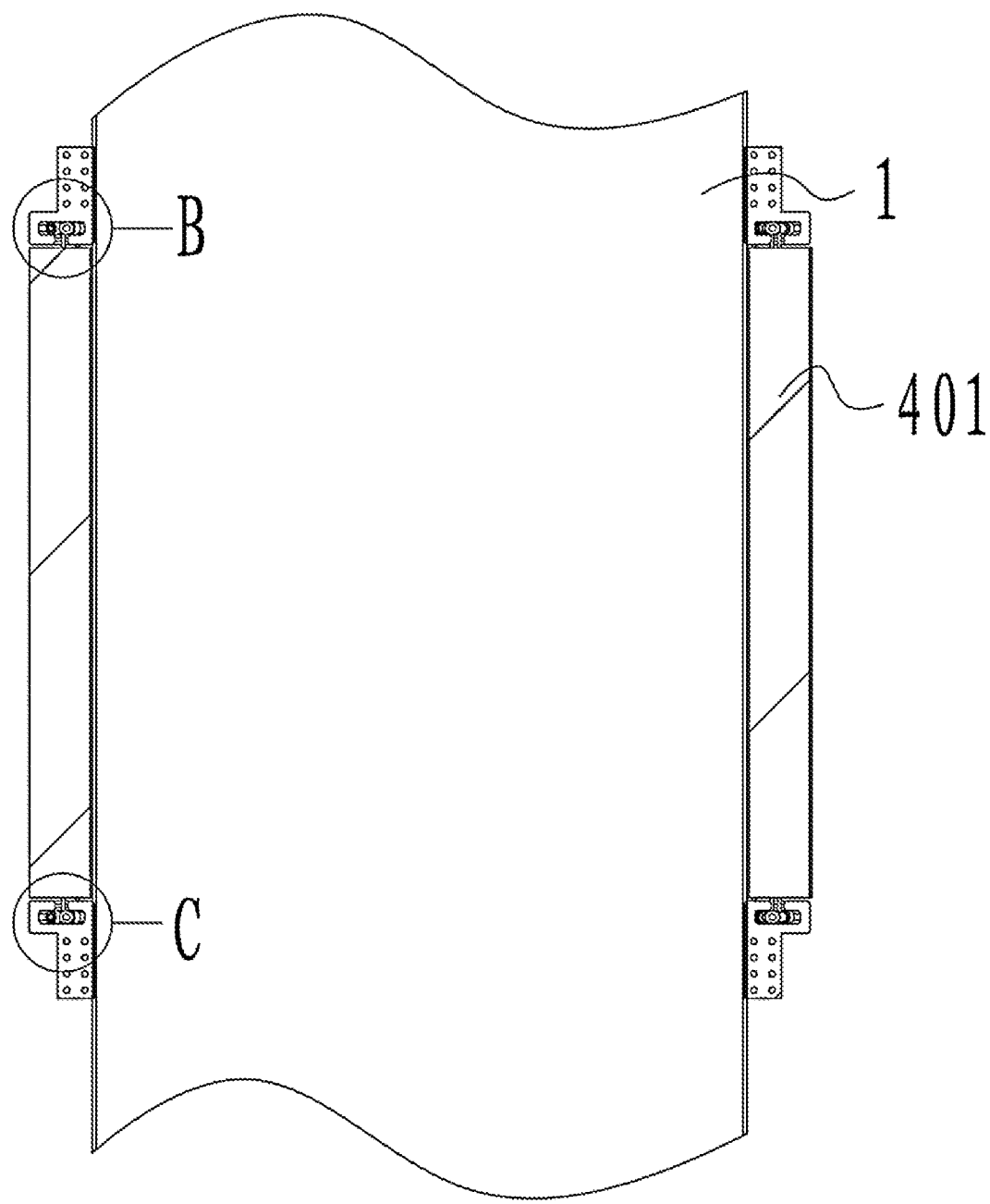
FIG. 4 is a schematic cross-sectional structural diagram of the embodiment 1.
Figure 5:
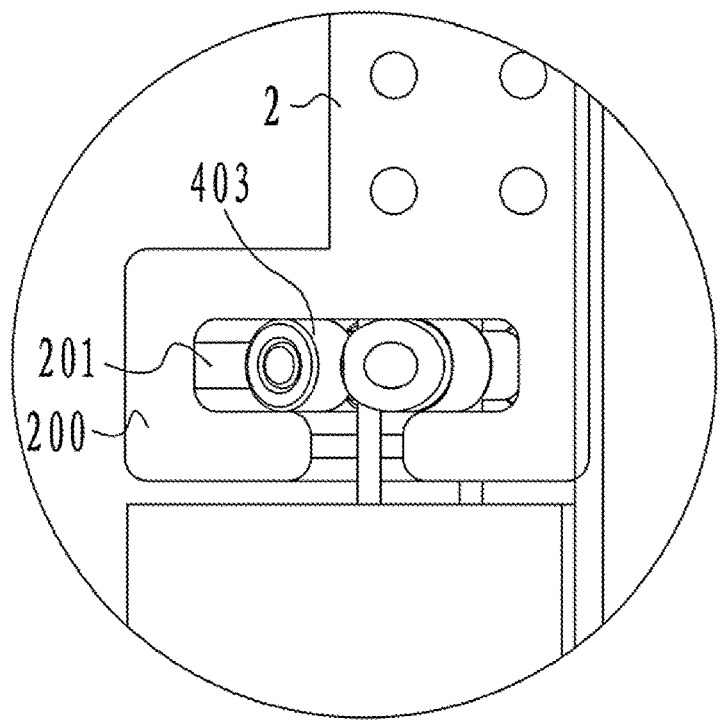
FIG. 5 is an enlarged view of B in FIG. 4.

Continuing to refer to FIG. 4 and FIG. 5, the first sliding mechanism is a first roller wheel mechanism, and includes a first wheel shaft 402 that is horizontally arranged, and two first roller wheels 403 rotatably connected to two ends of the first wheel shaft 402 by bearings. An upper end of the central shaft 406 is rotatably connected with the first wheel shaft 402 by a bearing. Specifically, the first hoop 2 is provided with a first slide rail 200, the first slide rail 200 is formed with a first slide rail groove 201, the first slide rail groove 201 is a T-shaped groove, and the first roller wheel mechanism is located in the first slide rail groove 201, and has the two first roller wheels 403 slidably connected with the first slide rail groove 201.

Figure 6:
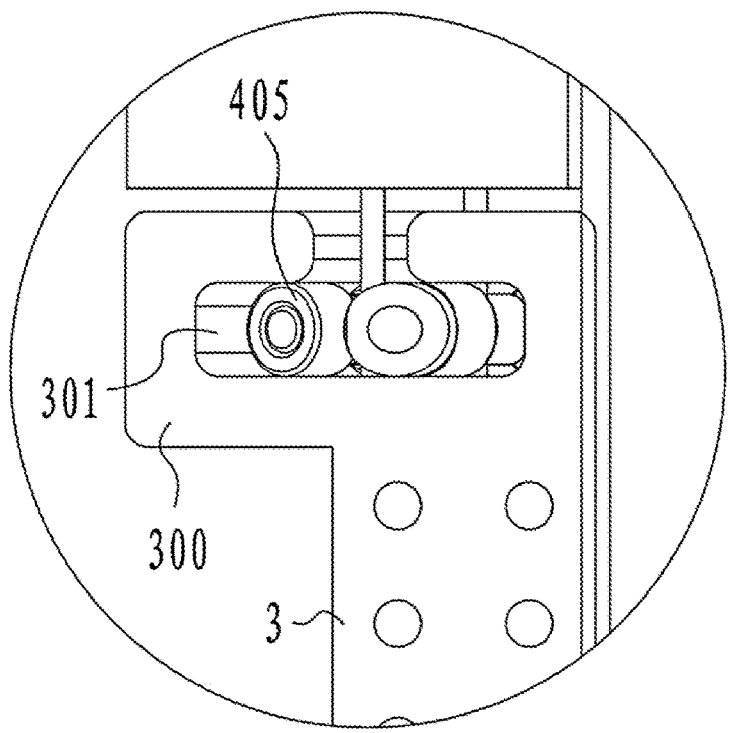
FIG. 6 is an enlarged view of C in FIG. 4.
Figure 7:
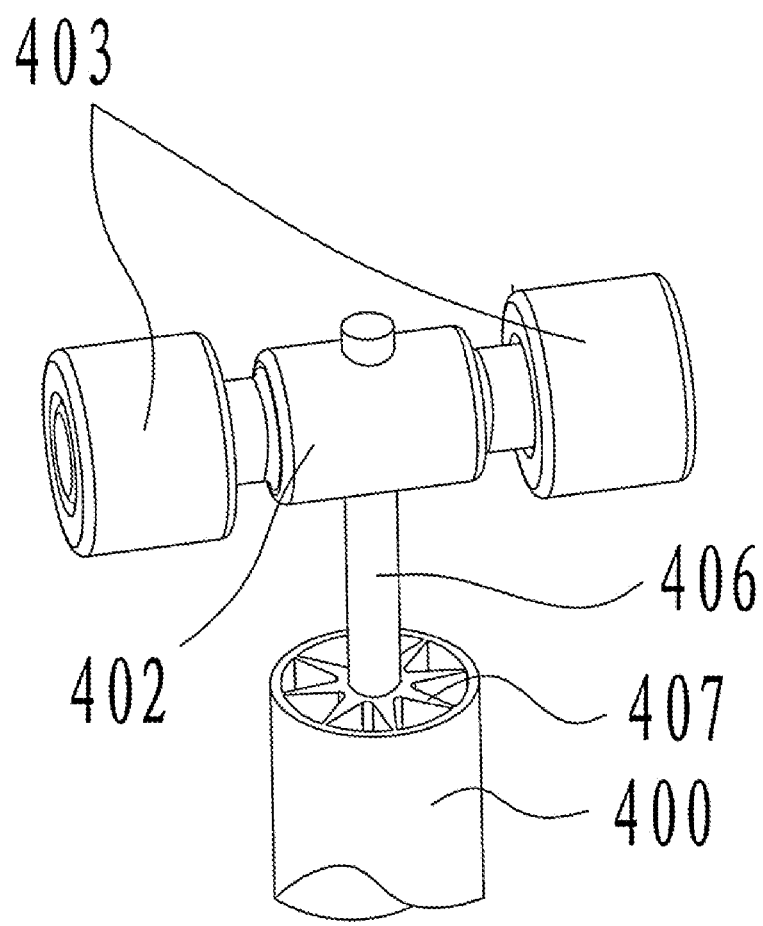
FIG. 7 is a schematic diagram of a connection structure of a first roller wheel mechanism and a support shaft mechanism in the embodiment 1.
Figure 8:
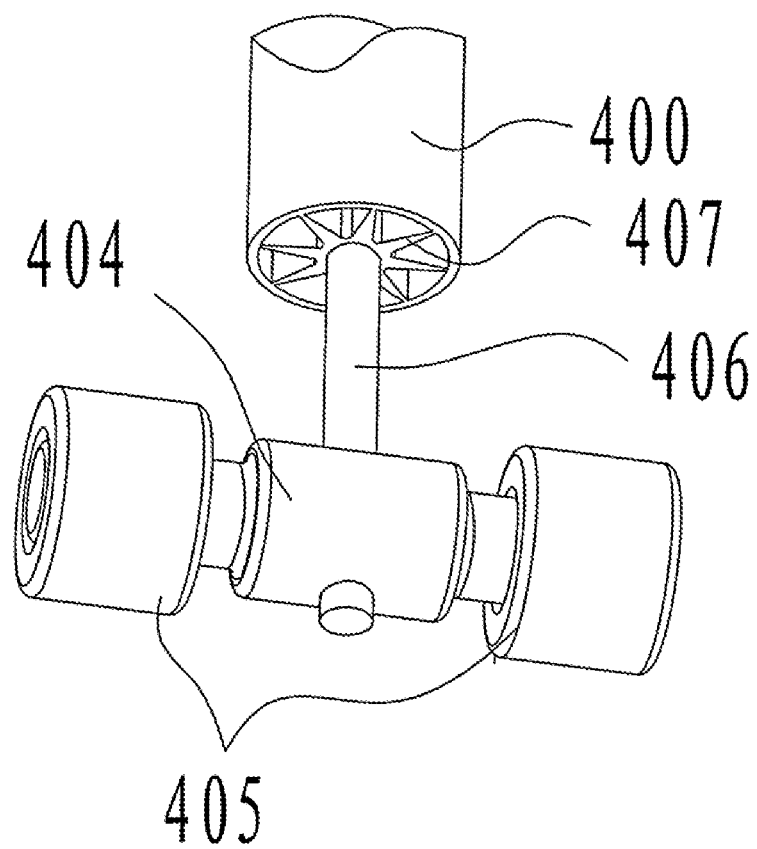
FIG. 8 is a schematic diagram of a connection structure of a second roller wheel mechanism and the support shaft mechanism in the embodiment 1.

Continuing to refer to FIG. 4 and FIG. 6, the second sliding mechanism is a second roller wheel mechanism, and includes a second wheel shaft 404 that is horizontally arranged, and two second roller wheels 405 rotatably connected to two ends of the second wheel shaft 404 by bearings. A lower end of the central shaft 406 is rotatably connected with the second wheel shaft 404 by a bearing. Specifically, the second hoop 3 is provided with a second slide rail 300, the second slide rail 300 is formed with a second slide rail groove 301, the second slide rail groove 301 is a T-shaped groove, and the second roller wheel mechanism is located in the second slide rail groove 301, and has the two second roller wheels 405 slidably connected with the second slide rail groove 301.

Continuing to refer to figures, the first hoop 2 includes at least two first hoop components, the first hoop components are of an arc-shaped structure, and the first hoop components are connected end to end by bolts to form the complete first hoop 2. Similarly, the second hoop 3 includes at least two second hoop components, the second hoop components are of an arc-shaped structure, and the second hoop components are connected end to end by bolts to form the complete second hoop 3.

It should be noted that the number of the first hoop components in the first hoop 2 and the second hoop components in the second hoop 3 can be set as required.

Embodiment 2

Figure 9:
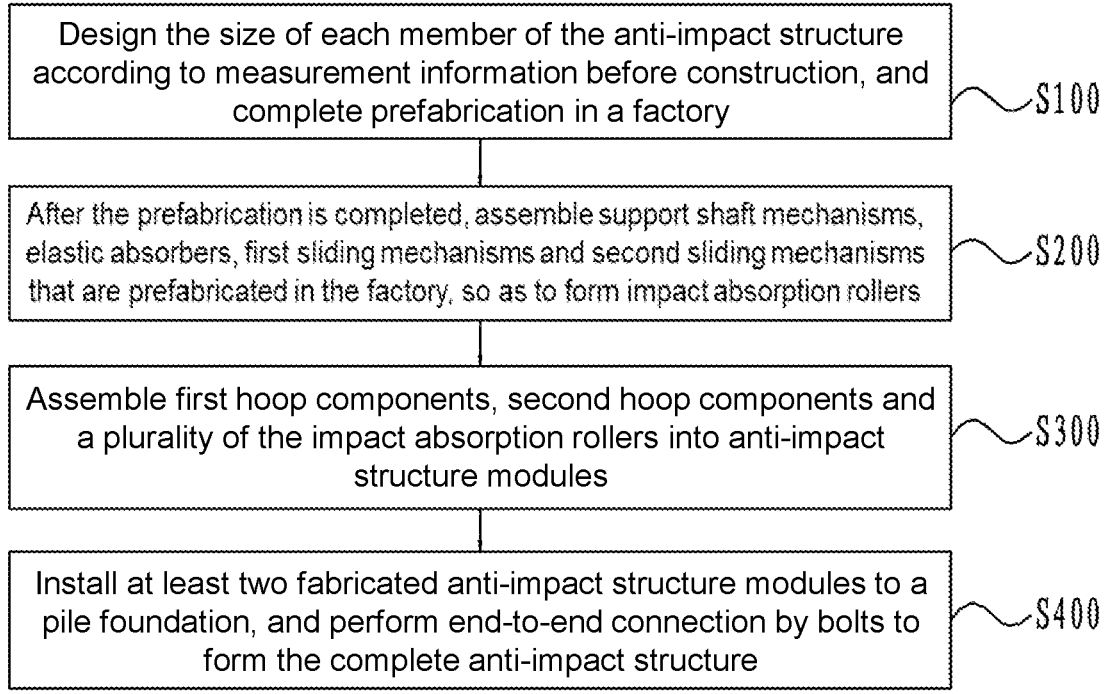
FIG. 9 is a flow chart of an embodiment 2.

Referring to FIG. 9, a construction method of a pile foundation for offshore wind power includes the following steps.

Step S100: designing the size of each member of the anti-impact structure according to measurement information before construction, and completing prefabrication in a factory.

Step S200: after the prefabrication is completed, support shaft mechanisms, elastic absorbers 401, first sliding mechanisms and second sliding mechanisms that are prefabricated are assembled in the factory, so as to form impact absorption rollers 4.

Step S300: first hoop components, second hoop components and a plurality of the impact absorption rollers 4 are assembled into anti-impact structure modules.

Step S400: at least two fabricated anti-impact structure modules are installed to a pile foundation 1, and end-to-end connection is performed by bolts to form the complete anti-impact structure.

In the step S300, the specific operation of installing the impact absorption rollers 4 includes: the first sliding mechanisms of the impact absorption rollers 4 are stuffed into first slide rail grooves 201 from end faces of the first hoop components, the second sliding mechanisms of the impact absorption rollers 4 are stuffed into second slide rail grooves 301 from end faces of the second hoop components, and the impact absorption rollers 4 are installed one by one between the first hoop components and the second hoop components to form the anti-impact structure modules. In the step S400, two anti-impact structure modules are assembled into a complete anti-impact structure.

The specific operation of the step S400 includes: two anti-collision structural modules are tightly held on the pile foundation 1, two first hoop components are connected end to end by high-strength bolts, two second hoop components are connected end to end by high-strength bolts, and when the first hoop components and the second hoop components are respectively connected with the pile foundation 1, rubber pads are placed on inner sides of the first hoop components and the second hoop components to increase the frictional force and reduce the damage to the pile foundation 1.

According to engineering requirements, a plurality of anti-impact structures can be installed along the length of the pile foundation 1 to protect a structure.

Other embodiments of the disclosure will be apparent to those skilled in the art from consideration of the specification and practice of the disclosure disclosed herein. The disclosure is intended to cover any variations, uses or adaptations of the disclosure. These variations, uses, or adaptations follow the general principles of the disclosure and include common general knowledge or conventional technical means in the art that are not disclosed in the present disclosure. The specification and embodiments are illustrative, and the real scope and spirit of the present disclosure is defined by the appended claims.

It should be understood that the disclosure is not limited to the precise structures that have been described above and shown in the drawings, and various modifications and variations can be made without departing from the scope thereof. The scope of the disclosure is limited only by the appended claims.

What is claimed is:

1. A pile foundation, comprising an anti-impact structure for offshore wind power, wherein the anti-impact structure is sleeved on the pile foundation, and comprises a first hoop, an impact absorption assembly and a second hoop that are arranged in sequence from top to bottom; the first hoop and the second hoop are configured to hold the pile foundation tightly; the impact absorption assembly comprises a plurality of impact absorption rollers arranged around the pile foundation; each of the impact absorption rollers comprises a support shaft mechanism vertically arranged along the pile foundation, an elastic absorber sleeved on the support shaft mechanism, a first sliding mechanism rotatably arranged at an upper end of the support shaft mechanism, and a second sliding mechanism rotatably arranged at a lower end of the support shaft mechanism; the first sliding mechanism is slidably connected to the first hoop; the second sliding mechanism is slidably connected to the second hoop; and the support shaft mechanism is rotatable relative to the first sliding mechanism and the second sliding mechanism.

2. The pile foundation according to claim 1, wherein the support shaft mechanism comprises a central shaft, a sleeve sleeved outside the central shaft, and a hub fixedly arranged between the central shaft and the sleeve; and upper and lower ends of the central shaft are respectively and rotatably connected to the first sliding mechanism and the second sliding mechanism.

3. The pile foundation according to claim 2, wherein the first sliding mechanism is a first roller wheel mechanism, and comprises a first wheel shaft and first roller wheels arranged on the first wheel shaft; and an upper end of the central shaft is rotatably connected to the first wheel shaft.

4. The pile foundation according to claim 3, wherein the first hoop is provided with a first slide rail, the first slide rail is formed with a first slide rail groove, the first roller wheel mechanism is located in the first slide rail groove, and the first roller wheels of the first roller wheel mechanism are slidably connected to the first slide rail groove.

5. The pile foundation according to claim 2, wherein the second sliding mechanism is a second roller wheel mechanism, and comprises a second wheel shaft and second roller wheels arranged on the second wheel shaft; and a lower end of the central shaft is rotatably connected to the second wheel shaft.

6. The pile foundation according to claim 5, wherein the second hoop is provided with a second slide rail, the second slide rail is formed with a second slide rail groove, and the second roller wheel mechanism is located in the second slide rail groove, and the second roller wheels of the second roller wheel mechanism are slidably connected to the second slide rail groove.

7. The pile foundation with an anti-impact structure for offshore wind power according to claim 1, wherein the first hoop comprises at least two first hoop components, the first hoop components are of an arc-shaped structure, and the first hoop components are connected end to end by bolts to form the first hoop.

8. The pile foundation with an anti-impact structure for offshore wind power according to claim 1, wherein the second hoop comprises at least two second hoop components, the second hoop components are of an arc-shaped structure, and the second hoop components are connected end to end by bolts to form the second hoop.

9. A construction method of a pile foundation with an anti-impact structure for offshore wind power, the construction method comprising the following steps:
   step S100: designing a size of support shaft mechanisms, elastic absorbers, first sliding mechanisms and second sliding mechanisms of the anti-impact structure according to measurement information before construction, and completing prefabrication of the support shaft mechanisms, the elastic absorbers, the first sliding mechanisms and the second sliding mechanisms in a factory;
   step S200: after the prefabrication is completed, assembling the support shaft mechanisms, the elastic absorbers, the first sliding mechanisms and the second sliding mechanisms that are prefabricated in the factory, so as to form impact absorption rollers;
   step S300: assembling first hoop components, second hoop components and a plurality of the impact absorption rollers into anti-impact structure modules; and
   step S400: installing at least two fabricated anti-impact structure modules to the pile foundation, and performing end-to-end connection by bolts to form the anti-impact structure.

10. The construction method according to claim 9, wherein in the step S400, when the first hoop components and the second hoop components are connected to the pile foundation, rubber pads are placed on inner sides of the first hoop components and the second hoop components.

* * * * *